United States Patent [19]
Westphal et al.

[11] Patent Number: 5,570,615
[45] Date of Patent: Nov. 5, 1996

[54] ARRANGEMENT FOR BALANCING VARYING MOMENTS AND VIBRATIONS IN A MOTOR VEHICLE DRIVE TRAIN

[75] Inventors: Christian Westphal, Meine; Andreas Rundkowski, Braunschweig, both of Germany

[73] Assignee: Volkswagen AG, Wolfsburg, Germany

[21] Appl. No.: 442,830

[22] Filed: May 17, 1995

[30] Foreign Application Priority Data

May 25, 1994 [DE] Germany ............... 44 18 190.6

[51] Int. Cl.[6] ............................................. F16F 15/10
[52] U.S. Cl. ..................... 74/574; 74/572; 464/68; 192/87.1
[58] Field of Search .................. 74/572–574, 606 R; 475/5, 6; 464/63–68; 180/165; 192/87.1; 477/5

[56] References Cited

U.S. PATENT DOCUMENTS

| | | | |
|---|---|---|---|
| 3,566,717 | 3/1971 | Berman et al. | 475/5 |
| 3,749,194 | 7/1973 | Bardwick | 192/4 A X |
| 3,861,484 | 1/1975 | Joslin | 180/65 A |
| 4,116,006 | 9/1978 | Wallis | 74/572 X |
| 4,193,322 | 3/1980 | Morino et al. | 74/606 R X |
| 4,252,208 | 2/1981 | Heidemeyer et al. | 180/165 |
| 4,411,171 | 10/1983 | Fiala | 74/572 X |
| 4,422,535 | 12/1983 | Ling | 464/63 X |
| 4,573,374 | 3/1986 | Koshimo et al. | 74/574 |
| 4,790,792 | 12/1988 | Bopp | 464/66 |

FOREIGN PATENT DOCUMENTS

| | | | |
|---|---|---|---|
| 3720559 | 1/1988 | Germany . | |
| 3816902 | 12/1988 | Germany | 74/573 R |
| 4326155 | 2/1994 | Germany | 74/595 |
| 2285109 | 6/1995 | United Kingdom | 74/573 R |

*Primary Examiner*—Vinh T. Luong
*Attorney, Agent, or Firm*—Brumbaugh, Graves, Donohue & Raymond

[57] ABSTRACT

To balance varying moments and reduce vibrations in the drive train of a motor vehicle, three flywheel masses and a clutch are provided in a common housing. Two flywheel masses are connected by springs to provide a dual-mass flywheel for reducing vibrations which can be transmitted into the transmission from the crankshaft and the third flywheel mass is connected to the first flywheel mass by planet gears mounted in fixed relation to the housing so that the direction of rotation of the third flywheel mass is opposite to the direction of rotation of the crankshaft.

9 Claims, 1 Drawing Sheet

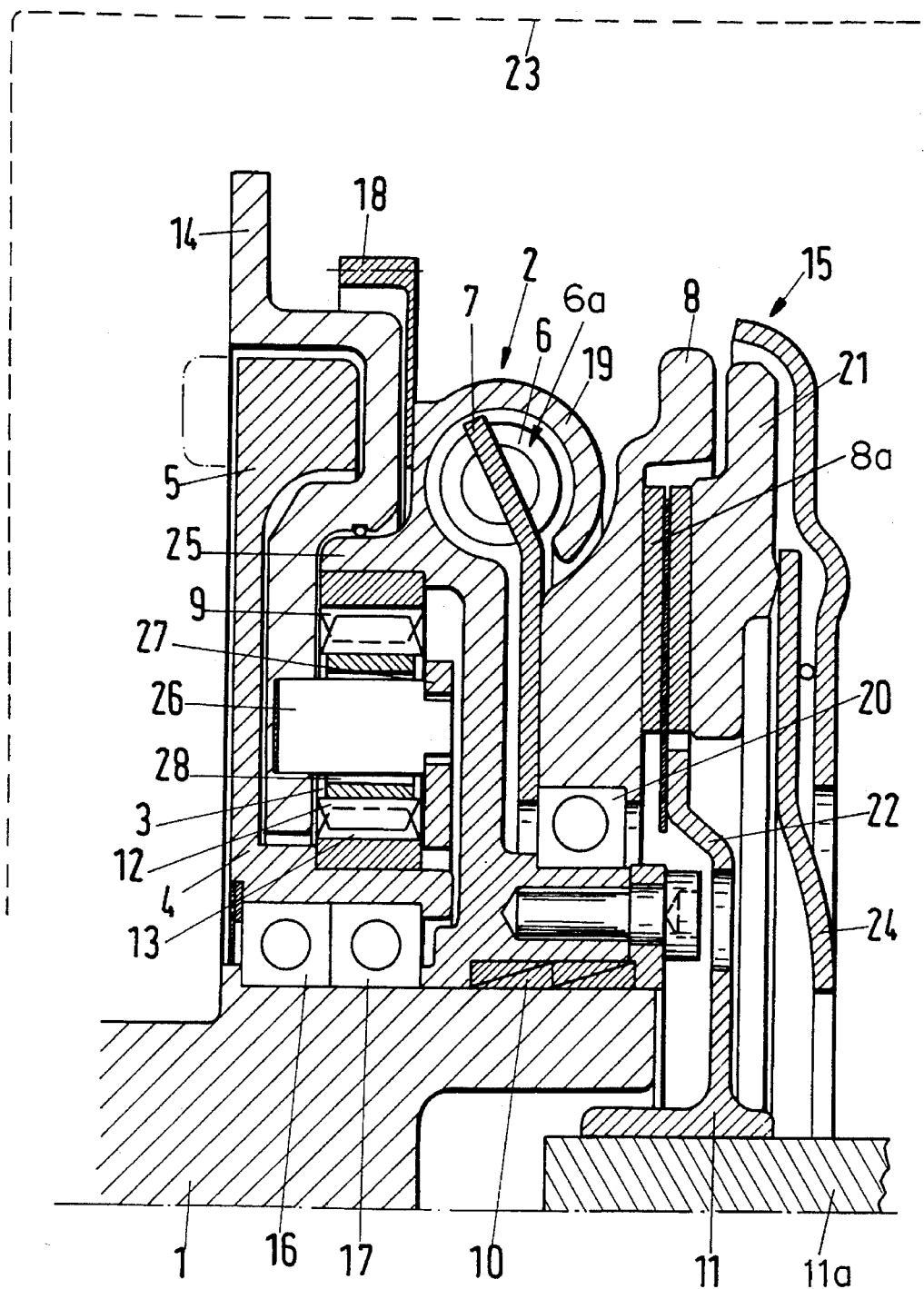

ARRANGEMENT FOR BALANCING VARYING MOMENTS AND VIBRATIONS IN A MOTOR VEHICLE DRIVE TRAIN

BACKGROUND OF THE INVENTION

This invention relates to arrangements for balancing varying moments and vibrations in motor vehicle drive trains.

German Offenlegungsschrift No. 37 20 559 discloses a reciprocating-piston crankshaft engine in which, in order to balance varying moments about the longitudinal axis of the crankshaft of an internal-combustion engine which are generated by acceleration of inertia forces, the crankshaft is connected on its output side to planet gear carriers supporting planet gears which engage internal teeth in a housing. When the crankshaft is rotated, the planet gears forming the balancing mass for the varying moments occurring in the internal-combustion engine rotate in a direction which is opposite to the crankshaft rotation and at the same rotational speed as the crankshaft rotation. The necessary balancing of varying moments in the internal-combustion engine can thus be accomplished advantageously without requiring an additional balancing shaft.

Moreover, German Offenlegungsschrift No. 38 16 902 discloses a so-called dual-mass flywheel used for the damping of vibrations in the drive train of a motor vehicle. This dual-mass flywheel is arranged in a conventional manner between the crankshaft of the internal-combustion engine and a transmission. In this arrangement, a first flywheel mass of the dual-mass flywheel is affixed to the crankshaft of the internal combustion engine and a second flywheel mass is connectable to the input shaft of the transmission by a clutch which is preferably a friction clutch. A spring damping device is connected between the two flywheel masses in such a way that relative angular motion between these two parts of the dual-mass flywheel is possible.

SUMMARY OF THE INVENTION

Accordingly, it is an objection of the present invention to provide an arrangement for balancing varying moments and vibrations in a motor vehicle drive train which overcomes the disadvantages of the prior art.

Another object of the invention is to provide an arrangement for balancing varying moments and vibrations in a motor vehicle drive train which has an especially short structure.

These and other objects of the invention are attained by providing a balancing arrangement having two flywheel masses which are coupled by a spring damping device and a third flywheel mass coupled to one of the other flywheel masses by planet gears.

Accordingly, an arrangement for balancing varying moments and vibrations in a motor vehicle drive train includes three flywheel masses within a common housing. The first flywheel mass is rotationally affixed to the crankshaft in a conventional manner and is coupled by a spring damping system to the second flywheel mass. The second flywheel mass is followed by a friction clutch by which the second flywheel mass can be connected to the transmission input shaft in a conventional manner. The first and second flywheel masses, being connected by the spring damping system, thus perform the function of damping vibrations in the drive train.

The third flywheel mass in the housing acts to balance the varying moments rotational inertia about the longitudinal axis of the crankshaft which are generated by acceleration or inertia forces. This third flywheel mass, rotating in the direction opposite to the direction of rotation of the crankshaft, is driven by the first flywheel mass affixed to the crankshaft.

In a preferred embodiment of the invention, a ring gear having internal teeth is formed for this purpose on the first flywheel mass and engages the planet gears which are mounted in fixed relation to the housing. The planet gears also engage a ring gear formed on the third flywheel mass which constitutes a sun gear and which is supported by bearings on the crankshaft of the internal-combustion engine.

In a further embodiment of the invention, a starter ring is provided on the radially outer portion of the first flywheel mass. Moreover, the first flywheel mass may be rotationally affixed to the crankshaft by an annular spring clamping element.

Furthermore, the first flywheel mass is arranged to receive at least one spring which is connected to the first flywheel mass and to the second flywheel mass. Moreover, in an exemplary embodiment, the spring is connected to a web plate which is connected to the second flywheel mass which constitutes a clutch thrust plate for the friction clutch.

In a further embodiment of the invention, the second flywheel mass, which constitutes a clutch thrust plate, is supported by a bearing on the first flywheel mass.

Furthermore, the clutch in this arrangement has a clutch disc which is positioned between the second flywheel mass, which constitutes a clutch thrust plate, and a clutch thrust body. This clutch disc can be connected by a flange to the transmission input shaft. Thus, the arrangement of the present invention is effective to balance varying moments and vibrations in the drive train for a motor vehicle having a reciprocating internal-combustion engine connectable to a transmission, and also for balancing varying moments and torsional vibrations in the internal combustion engine.

BRIEF DESCRIPTION OF THE DRAWINGS

Further objects and advantages of the invention will be apparent from a reading of the following description in conjunction with the accompanying drawing which is a schematic fragmentary view illustrating a representative embodiment of a drive train balancing arrangement in accordance with the invention.

DESCRIPTION OF PREFERRED EMBODIMENTS

In the typical balancing arrangement shown in the drawings, three flywheel masses 2, 5 and 8 are disposed in a common housing 23 along with a clutch device 15.

The first flywheel mass 2 is rotationally affixed by conventional annular-spring clamping elements 10 to a crankshaft 1 of an internal-combustion engine which projects into the housing 23. A starter ring gear 18 is provided on the periphery of the flywheel mass 2. Moreover, the first flywheel mass 2 has a spring-receiving device 19 in its outer portion which receives at least one spring 6 of a conventional spring-damping system. The spring 6, which is thus connected to the first flywheel mass 2 is also connected to a web plate 7 which is affixed to the second flywheel mass 8.

The second flywheel mass 8 constitutes a thrust plate 8a for the clutch 15 and is supported by a bearing 20 on the first flywheel mass 2.

A clutch disc 22, which can be connected by a flange 11 to a transmission input shaft 11a is disposed between the clutch thrust plate 8a of the second flywheel means 8, which has a friction lining, and a clutch thrust body 21 which is engaged by a cup spring 24 and also has a friction lining.

A ring gear 25 formed on the crankshaft side of the first flywheel mass 2 has internal teeth 9 which mesh with the teeth 12 of a plurality of planet gears 3 supported on corresponding axles 26 by planet-gear bearings 28. The axles 26 are carried by a web 14 affixed to the housing, and are received in a bearing component 27 connected to the web 14.

The teeth 12 of the planet gears 3 also engage a ring gear 13 on the third flywheel mass 5 which constitutes a sun gear having teeth which extend radially outwardly from the crankshaft 1.

Because the third flywheel mass 5 is driven by the first flywheel mass 2 through the planet gears 3, the third flywheel mass 5 rotates in the direction opposite to the direction of rotation of the crankshaft 1. As a result, rotational irregularities of the crankshaft can be compensated very effectively and in a particularly space-saving arrangement.

In a further embodiment, the planet gears 3 are provided with a conventional play-compensating device of the type described in German Offenlegungsschrift No. 43 26 155.

By virtue of the extremely compact design of balancing the arrangement according to the invention, it can be used to advantage particularly in small and fuel-saving internal combustion engines, for example three-cylinder reciprocating internal combustion engines.

Although the invention has been described herein with reference to specific embodiments, many modifications and variations therein will readily occur to those skilled in the art. Accordingly, all such variations and modifications are included within the scope of the invention.

WE CLAIM:

1. An arrangement for the balancing of varying moments and vibrations in the drive train of a motor vehicle having an internal combustion engine, comprising a crankshaft, a first flywheel mass connected to the crankshaft, a second flywheel mass connectable through a clutch to a transmission input shaft, a spring-damping means connected between the first and second flywheel masses so that relative angular motion between the first and second flywheel masses is permitted, a third flywheel mass rotatably mounted on the crankshaft, a common housing for the flywheel masses and a planetary gear system including a plurality of planet gears on a planet gear carrier affixed to the common housing, the planet gears engaging gears on the first and third flywheel masses, respectively, so that the third fly, wheel mass is driven in a rotational direction opposite to the direction of rotation of the first flywheel mass so as to balance varying rotational moments.

2. An arrangement according to claim 1 wherein the planetary gear system includes a ring gear formed on the first flywheel mass and having internal teeth, and the plurality of planet gears have external teeth engaging the ring gear.

3. An arrangement according to claim 1 wherein the planetary gear system includes a sun gear on the third flywheel mass engaging the external teeth of the planet gears.

4. An arrangement according to claim 1 including a starter ring gear formed on the periphery of the first flywheel mass.

5. An arrangement according to claim 4 wherein the first flywheel mass is mounted on the crankshaft by an annular-spring clamping element.

6. An arrangement according to claim 4 wherein the first flywheel mass includes a device for receiving at least one spring of the spring-damping means which is connected between the first flywheel mass and the second flywheel mass.

7. An arrangement according to claim 6 wherein the spring is connected to a web plate fastened to the second flywheel mass.

8. An arrangement according to claim 1 wherein the second flywheel mass includes a clutch thrust plate and is supported by a bearing on the first flywheel mass.

9. An arrangement according to claim 8 including a clutch disc connectable to the transmission input shaft by a flange disposed between the clutch thrust plate and a clutch thrust body.

* * * * *